United States Patent [19]

Parlanti

[11] 4,133,208

[45] Jan. 9, 1979

[54] PROBE-TYPE READ-OUT THERMOMETER

[76] Inventor: Conrad A. Parlanti, 194 Constitution Dr., Menlo Park, Calif. 94025

[21] Appl. No.: 872,374

[22] Filed: Jan. 26, 1978

[51] Int. Cl.² ............................................. G01K 7/00
[52] U.S. Cl. .......................... 73/362 SC; 340/347 AD
[58] Field of Search .................... 73/362 SC, 362 AR; 340/347 AD; 338/22 SD

[56] References Cited

U.S. PATENT DOCUMENTS

| | | | |
|---|---|---|---|
| 3,832,668 | 8/1974 | Berman | 73/362 SC |
| 3,834,238 | 10/1974 | Mueller | 73/362 AR |

Primary Examiner—Donald O. Woodiel
Attorney, Agent, or Firm—Julian Caplan

[57] ABSTRACT

A heat sensitive probe has a tip having a semi-conductor unit mounted on good thermal conductng material assembled in a vacuum or by other means to insure good thermal contact with the outside of the probe and hence very quick response time. The semi-conductor is connected to a suitable voltage source and has an output related to ambient temperature. Conversion of the output current to a suitable voltage uses a very stable resistor which generates a compatible voltage charge with temperature acceptable to the indicating unit, which is preferably a digital display. To avoid inaccuracies from temperature variations of the display unit, a highly stable reference voltage source and suitable divider networks constructed of temperature stable resistors of the same material as the aforementioned stable resistor at the current to voltage stage are employed. Since repeatable semi-conductor probes are not presently commercially available, a current regulator trimmed by selection of resistors to standardize the output of one temperature are employed.

7 Claims, 12 Drawing Figures

PROBE-TYPE READ-OUT THERMOMETER

This invention relates to a new and improved probe-type digital read-out thermometer.

In one embodiment of the invention, the tip of a probe is pointed for insertion in meat and poultry. In another embodiment of the invention, the tip is blunt for measurement of temperature of liquids and the like. A particular feature of the invention is the fact that a digital read-out is provided.

A principal object and advantage of the invention is to provide means for precise measurement of temperature by electronic means which is electrically corrected for precision of measurement.

A further feature of the invention is the construction of a tip inserted in the probe, the tip including a semi-conductor and being so constructed that fast resolution is provided with little interference, and hence the energy from the semi-conductor is immediately transmitted to the read-out display. In such transmission, the signals from the semi-conductor are corrected electronically.

The semi-conductors hereinafter described may be transistors, diodes or integrated circuits, depending upon certain conditions. Transistors are normally used to function as a diode and are selected from types having a temperature coefficient of approximately 2 mv per ° C. Although such transistors are advantageous from a cost standpoint, there are certain disadvantages in their use. One is the low output in volts per degree. Secondly, the results are not repeatable from unit to unit in that the slope is not repeatable, the datum voltage is not constant from unit to unit and the output is not precisely linear when plotted against temperature. The maximum temperature range of transistors is approximately 200° C.

Diodes have substantially the same advantages and disadvantages as transistors.

Integrated circuits have the advantage of high output. The voltage output is high. Also the current output is high which has the advantage of making it possible to use a long distance cable between the probe and the read-out. Further, there is minimum EMI susceptibility.

Other objects of the present invention will become apparent upon reading the following specification and referring to the accompanying drawings in which similar characters of reference represent corresponding parts in each of the several views.

Figure 1:
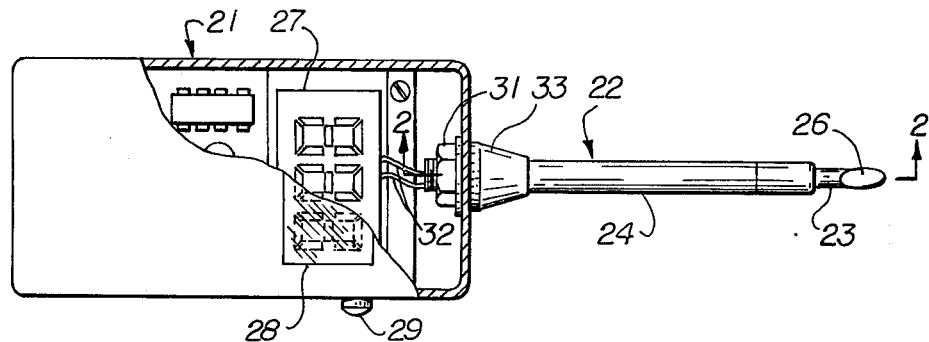
FIG. 1 is a plan view partly broken away in section to reveal internal construction of one modification of the present invention.
Figures 10, 11:
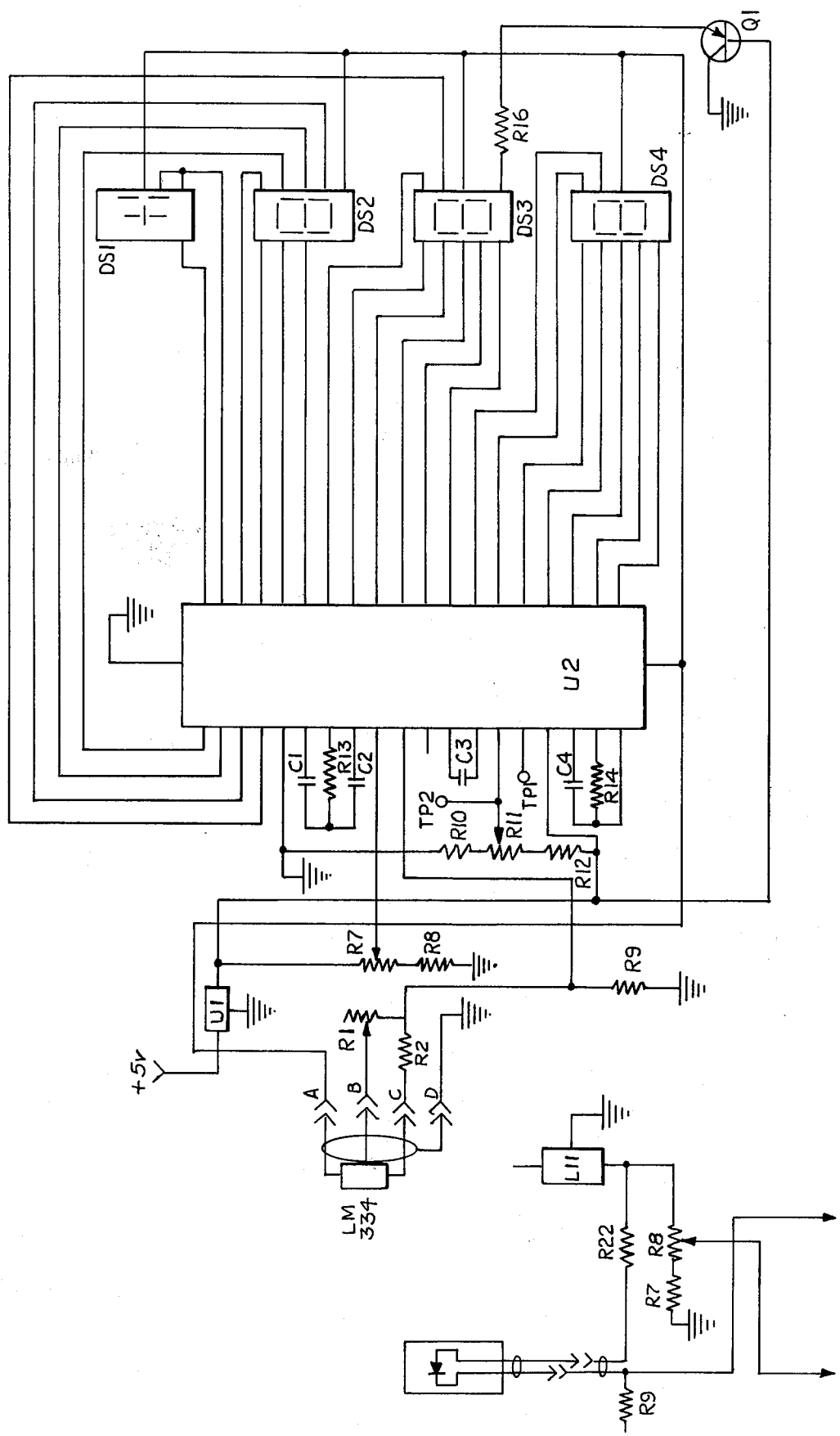
FIG. 10 is a wiring diagram showing one form of the present invention employing an integrated circuit.
FIG. 11 is a fragmentary view of a modification of the wiring diagram of FIG. 10 showing use of a transistor or diode.

Directing attention first to the structure of FIG. 1, there is provided a hand-held casing 21 to which is attached an elongated probe 22. In the modification illustrated, the tip 23 is secured to a shank 24 and the distal end of the tip 23 is formed with a bevelled face 26. Casing 21 contains a digital read-out 27 behind a display window 28. At a convenient location in the casing 21 is a switch button 29. Batteries (not shown) and the electronic components of the circuit are contained within the casing 21. The shank 24 has a connector which fits through an aperture in the casing 21, the inner end being threaded and held in place by a nut 31. The wiring 32 runs down through the shank 24 and is connected to the electrical components as shown in FIG. 10.

Figure 2:
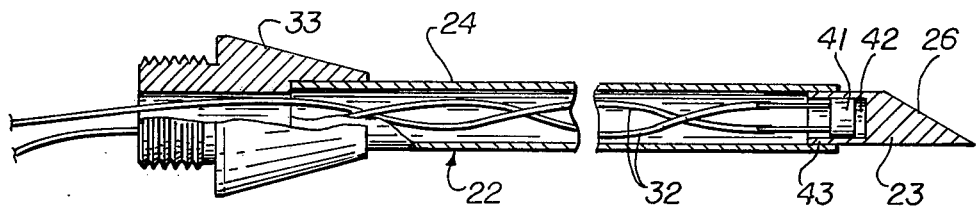
FIG. 2 is an enlarged sectional view taken substantially along the line 2—2 of FIG. 1.

FIG. 2 is an enlarged sectional view of one form of probe wherein the distal end of tip 23 is solid and the proximal end is hollow. Semi-conductor 41 is secured in the hollow portion of tip 23. Lead wires 32 extend out through an apertured collar 43 in such manner that the interior of the hollow portion 42 may be evacuated. Wires 32 are preferably coated with teflon or equivalent to withstand temperature extremes.

Probe 22 is heat sensitive and the ambient temperature is measured through the sensitive tip 23 and the information gathered is transmitted electrically via circuitry to the casing 21 where on pressing switch 29 the temperature is shown on digital read-out 27.

The thermometer has high thermal conductivity, the tip portion being sharp for insertion into frozen meat or food. In the modification shown in FIG. 4, however, the tip is blunt and can be used to measure ambient temperature in air or liquid.

The tip of the probe is mounted on a good thermal conducting material and is assembled in a vacuum chamber or other suitable environment. It is later cured at about 200° F. in order to insure good thermal contact with the outside of the probe. In this way, a very quick response time (e.g. 15 seconds) and good linearity is obtained in temperatures ranging from negative 40° F. to 300° F.

The electrical system is discussed below.

Figure 3:
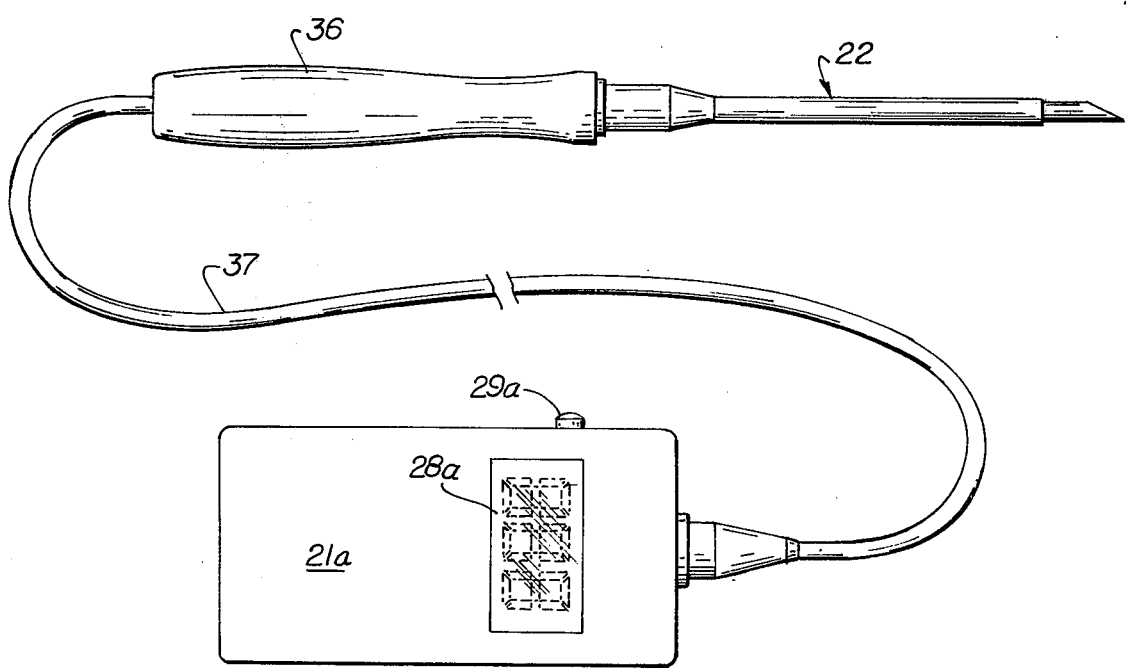
FIG. 3 is a plan view of a modification wherein the probe is attached to a handle and connected to a casing for a digital read-out by a cable.

In FIG. 3 probe 22a is connected to a handle 36 which is attached by cable 37 to casing 21a. In other respects the modification of FIG. 3 resembles that of FIG. 1.

Figure 4:
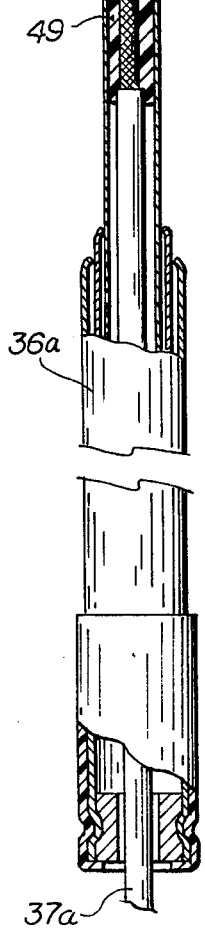
FIG. 4 is a view similar to FIG. 2 of a modified construction.
Figure 5:
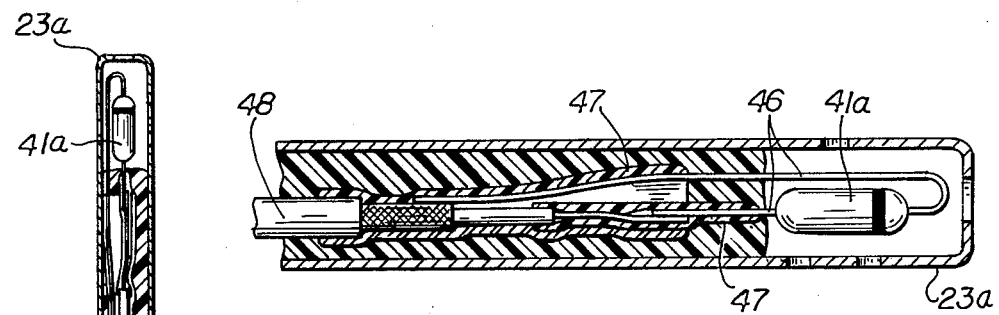
FIG. 5 is an enlarged detail of a portion of the tip of FIG. 4.

FIG. 4 shows a still further modified probe employing a handle 36a. In this form of the invention, shank 24a is hollow. The tip 23a is apertured so that if the probe is inserted in a liquid, there is circulation through the tip 23a. Similarly, if the probe is used to measure air temperature, air will circulate through the apertures in tip 23a. Within tip 23a is the semi-conductor 41a. Lead wires 46 thereto are received in shrink tubing 47 and connected to the conductors of coaxial cable 48 which runs through the probe shank 24a and into the handle 36a. An epoxy resin 49 fills the shank 42a above the hollow tip 23a.

Figure 6:
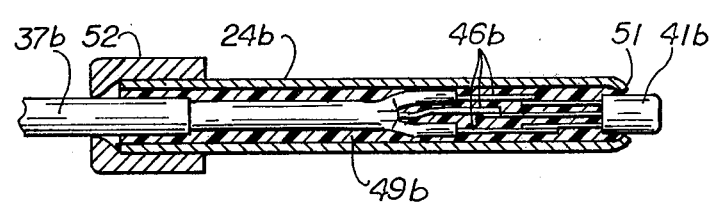
FIG. 6 is a view similar to FIG. 2 of a further modification.

FIG. 6 shows a still further modified probe wherein the semi-conductor 41b is exposed through the distal end of the shank 24b. Preferably, the member 41b is an integrated circuit in this modification of the invention. To form a liquid-tight assembly, the end 51 of the shank 24b is swedged around the body of the member 41b and the interior of the shank 24b is filled with epoxy 49b. Jacket 52 is shrunk around the proximal end of shank 24b and around the output cable 37b which leads to the casing 21 (not shown).

Figures 7, 8:
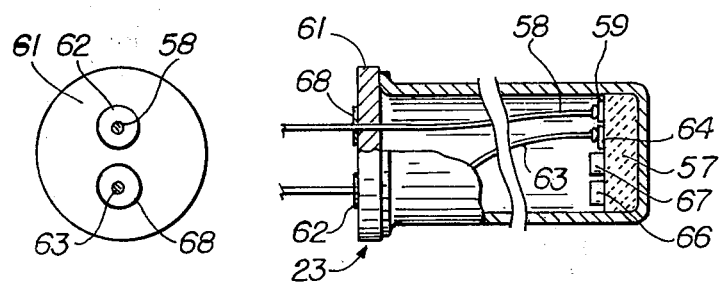
FIG. 7 is an enlarged fragmentary sectional view of the tip of one form of probe of the present invention.
FIG. 8 is a fragmentary plan view of a portion of FIG. 7.

Directing attention now to the probe tip 23 illustrated in FIGS. 7 and 8, a cup-shaped housing 56 is provided. In the bottom of the cup and brazed thereto is a ceramic disc 57. There are two lead wires in the modification of tip 23. The first lead wire 58 is formed with a nail head on its bottom end which is brazed to a metal pad 59 attached to the disc 57. The upper end of wire 58 runs through a hole in the cover 61 which is hermetically sealed to the lip of cup 56 and is preferably of a ceramic material. A metal pad 62 is apertured for a wire 58 and is sealed thereto. Second lead wire 63 is also affixed to a pad 64 on the ceramic disc 67 and extends out through the cover 61 and is sealed by means of a pad 68. Deposited on the disc 57 is an integrated circuit 66 (hereinafter described) as well as a resistor 67. The resistor 67 is laser trimmed to set the output of the integrated circuit to an exact scale factor so that the performance of various integrated circuits is "repeatable". In the hollow of the cup 56 dry nitrogen or other suitable environment is provided.

Figure 9:
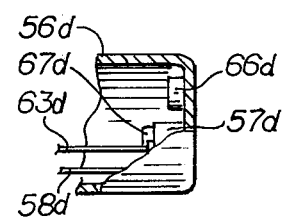
FIG. 9 is a fragmentary view of a portion of a modification of the structure of FIG. 7.

In the modification of FIG. 9, the integrated circuit 66d is attached to the housing 56d and the resistor 67d and the pads of the leads wires 58d and 63d are attached to the disc 57d which is of lesser size than the bottom of the cup 56d. The form shown in FIG. 9 is "high speed" by reason of the direct contact of the integrated circuit with the metal housing.

Figure 12:
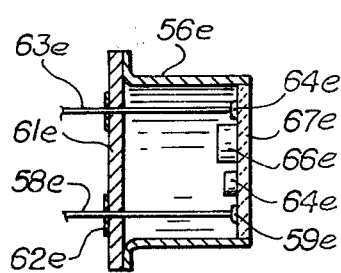
FIG. 12 is a view similar to FIG. 7 of a further modified probe tip.

FIG. 12 illustrates a further modification. Housing 58 is cylindrical and open at the bottom. Ceramic disk 67e comprises the bottom of the component, being brazed to the bottom edge of housing 58e. In other respects the various elements of FIG. 12 resemble those of FIG. 7 and the same reference numerals, followed by subscript e are used to designate corresponding parts.

It should be noted that in all the embodiments herein illustrated housing 56 is thin-walled, being made of ceramic or a metal such as aluminum or stainless steel. The thin wall inhibits heat transfer in either direction between disk 67, which carries the semi-conductor and resistor which comprise the sensing element, and the probe body. Hence a more accurate reading is achieved.

The utilization of a special semi-conductor which may be a transistor diode or integrated circuit as a sensing unit connected to a suitable voltage source has an output or voltage which is related to the temperature of the sensing unit. Assume that the semi-conductor is a LM 337 current regulator. Conversion of the output current to a suitable voltage by the use of a specially selected stable resistor R9, such as a precision metal film "RN" type can be employed. The value of the resistor is selected specifically to generate a compatible voltage change with temperature acceptable to the indicating unit.

Since the indicating unit may be powered from a battery supply, the input to the indicator unit such as an ICL 7107 dual slope A-D convertor will have an input offset between the battery voltage and ground. The value of voltage generated by the current voltage resistor R9 is designed by selection of resistor value to mate with the probe designed scale factor such as to produce the desired display reading at standard ice temperature. The display readings are dependent upon the units of temperature measurement thereafter.

Directing attention now to the wiring diagram of FIG. 10, it has been found that temperature variations of the display unit may cause slight variations in the digital read-out reading. A highly stable reference voltage source U1 is employed which, with the addition of a suitable divider network constructed of temperature stable resistor R7-12, inclusive, of the same material and temperature coefficient as the current to voltage change resistor R9 is employed. By these means, a change in ambient temperature causes the same percentage change in values of all the resistors, since they are all common to the input. Therefore, the references will change in the same percentages as the current to voltage resistor R9. The net result is to cancel out possible errors due to variation of ambient temperature of the display unit.

Special care is necessary to prevent the effects of dielectric absorption in the A-D convertor system. Dielectric absorption is a condition occurring where a capacitor is charged and discharged through a short. When the short is removed, voltage may suddenly appear on the capacitor, and this voltage depends on many varying factors such as the materials used, structure of the capacitor, applied voltage, etc. The result is that appreciable errors may develop in an AD convertor system. The source of errors is minimized in accordance with the present invention by the use of special capacitor materials, for example, polypropylyne.

Directing attention once again to FIGS. 7 and 8, repeatable semi-conductor probes due to poor manufacturing tolerances are currently not commercially available. However, a current regulator such as LM 334 can be trimmed by the use of specially selected resistors R1, R2 or R2A to produce an exact output current at a given temperature. This current varies with temperature in a constant and repeatable manner. It is only necessary to standardize the outputs at one temperature to generate a family of repeatable semi-conductor temperature sensing elements.

The thermal time constant of the probe can be made fast or slow, depending on the use to be made of the thermometer. In some cases, short term fast variations of temperature are desirable. In some cases, however, fast variations can cause the display to be unreadable. The speed can be varied depending on the selection of the probe construction techniques and the AD converter conversion rate.

FIG. 10 is a typical wiring diagram. Suitable values for components are as follows:

| | | | |
|---|---|---|---|
| R1. | 200 Ω | C1. | .22 μf |
| 2. | 230 Ω | 2. | .47 μf |
| 3. | | 3. | .1 μf |
| 4. | | 4. | 100 μf |
| 5. | | | |
| 6. | | | |
| 7. | 100 Ω | Q, | 2N5139 |
| 8. | 2.37K | | |
| 9. | 8.87K | U, | MC1403 |
| 10. | 18.7K | | |
| 11. | 1K | | LED displays - |
| 12. | 4.22K | | Hewlett Packard 5082-7730 |
| 13. | 220K | | Logic ICL 7107 |
| 14. | 100K | | |
| 15. | | | |
| 16. | 130 Ohm | | |

Where a transistor or diode is used as the sensing element, then as shown in FIG. 11, the high and low inputs to the circuit board 1CL are reversed from that of FIG. 10.

What is claimed is:

1. A heat-sensitive, digital read-out thermometer comprising
   a probe having a distal tip and a shank,
   said tip having a semi-conductor therein in thermal contact with the exterior of said tip,
   a casing associated with said shank and having a digital display and electronic components contained therein,
   lead wires from said semi-conductor extending through said shank and into said casing,
   and an electrical circuit comprising a driver for said digital display, a stable reference voltage source,
   a plurality of temperature stable resistors arranged in a voltage divider network, a voltage to current charge resistor of the same material and temperature coefficient as said first-mentioned resistors and of a value to generate a compatible voltage charge acceptable to said driver, said voltage to current charge resistor being connected to one of said lead wires and to ground, said one of said lead wires being connected to said driver.

2. A thermometer according to claim 1 in which said network comprises two subscircuits consisting of one variable and one fixed resistor in series and both connected to said voltage source, the tap of each said variable resistor being connected to said driver.

3. A thermometer according to claim 1 in which said tip comprises a thin-walled housing having a top and a bottom end, said semi-conductor being positioned on said bottom end and a resistor on said bottom end trimmed to set the output of said semi-conductor to an exact scale factor, said resistor being electrically connected to said semi-conductor, and lead wires from said first end out through said second end, said housing being hermetically sealed around said lead wires.

4. A thermometer according to claim 3 in which said semi-conductor is an integrated circuit and which further comprises a ceramic disk, said disk being at the bottom of said housing, said integrated circuit and said resistor being deposited on said disk.

5. A thermometer according to claim 3 in which said semi-conductor is an integrated circuit and which further comprises a ceramic disk, said disk being at the bottom of said housing, said integrated circuit being deposited on the bottom of said housing and said resistor on said disk.

6. A thermometer according to claim 3 in which said housing extends out through said tip.

7. A thermometer according to claim 3 in which said tip is hollow, said housing is in the interior of said hollow, and said tip is apertured for fluid communication between the exterior of said tip and said housing.

* * * * *